United States Patent [19]

Todd

[11] 4,098,248

[45] Jul. 4, 1978

[54] FUEL REGULATOR FOR A TWO-CYCLE GAS ENGINE

[76] Inventor: William L. Todd, 100 Cottonwood La., Gillette, Wyo. 82716

[21] Appl. No.: 628,535

[22] Filed: Nov. 3, 1975

Related U.S. Application Data

[63] Continuation-in-part of Ser. No. 532,624, Dec. 13, 1974, Pat. No. 3,919,995.

[51] Int. Cl.$^2$ ............................................. F02M 21/02
[52] U.S. Cl. ............................ 123/120; 123/139 AH; 123/27 GE
[58] Field of Search ........... 123/139 A, 139 AH, 120, 123/27 GE, 121; 261/50 A, 69 R; 48/184

[56] References Cited

U.S. PATENT DOCUMENTS

| | | | |
|---|---|---|---|
| 2,780,209 | 2/1957 | Renken | 123/27 GE |
| 2,788,082 | 4/1957 | Vanderpoel | 261/69 R |
| 2,983,592 | 5/1961 | Jones | 261/69 R |
| 3,282,664 | 11/1966 | Baverstock | 261/69 R |
| 3,421,483 | 1/1969 | Fox | 123/27 GE |
| 3,540,419 | 11/1970 | Fox | 123/27 GE |
| 3,545,948 | 12/1970 | Baverstock | 261/50 A |
| 3,814,067 | 6/1974 | Fuente | 123/32 SP |
| 3,846,094 | 11/1974 | Baverstock | 123/120 |

Primary Examiner—Ronald H. Lazarus
Attorney, Agent, or Firm—Van Valkenburgh and Lowe

[57] ABSTRACT

A large, two-cycle, port-scavenging gas engine commonly used for oil field pumping operations includes a mixing section at the intake of the scavenging chamber. Fuel gas flows through a supply line directly into this mixing section in a continuous manner controlled only by a governor valve at the gas inflow line. In contrast, the air intake fluctuates cyclically as the engine piston reciprocates. The present invention is a fuel regulator for such an engine which is a gas inflow control such as found in certain types of carburetors. Thus, the maximum gas inflow is regulated by the governor valve at the inflow line, but the fuel regulator of the gas inflow control restricts the fuel gas inflow to an amount proportional to the air inflow as the air inflow fluctuates.

5 Claims, 5 Drawing Figures

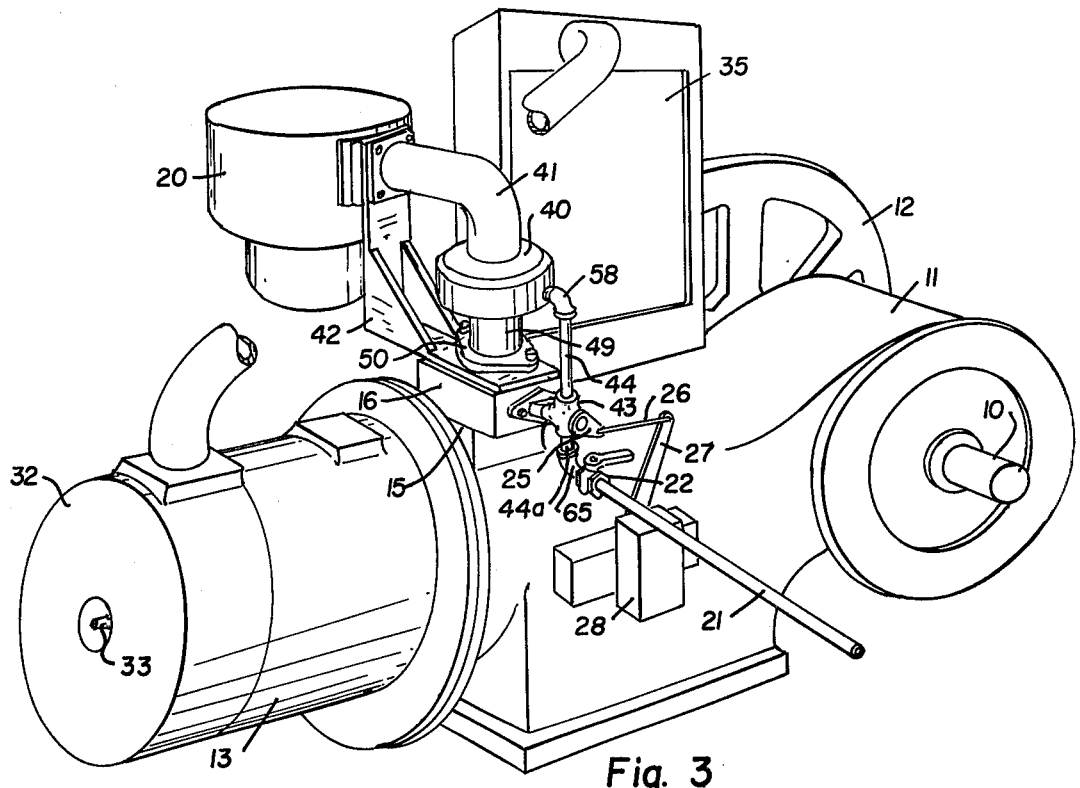
Fig. 3
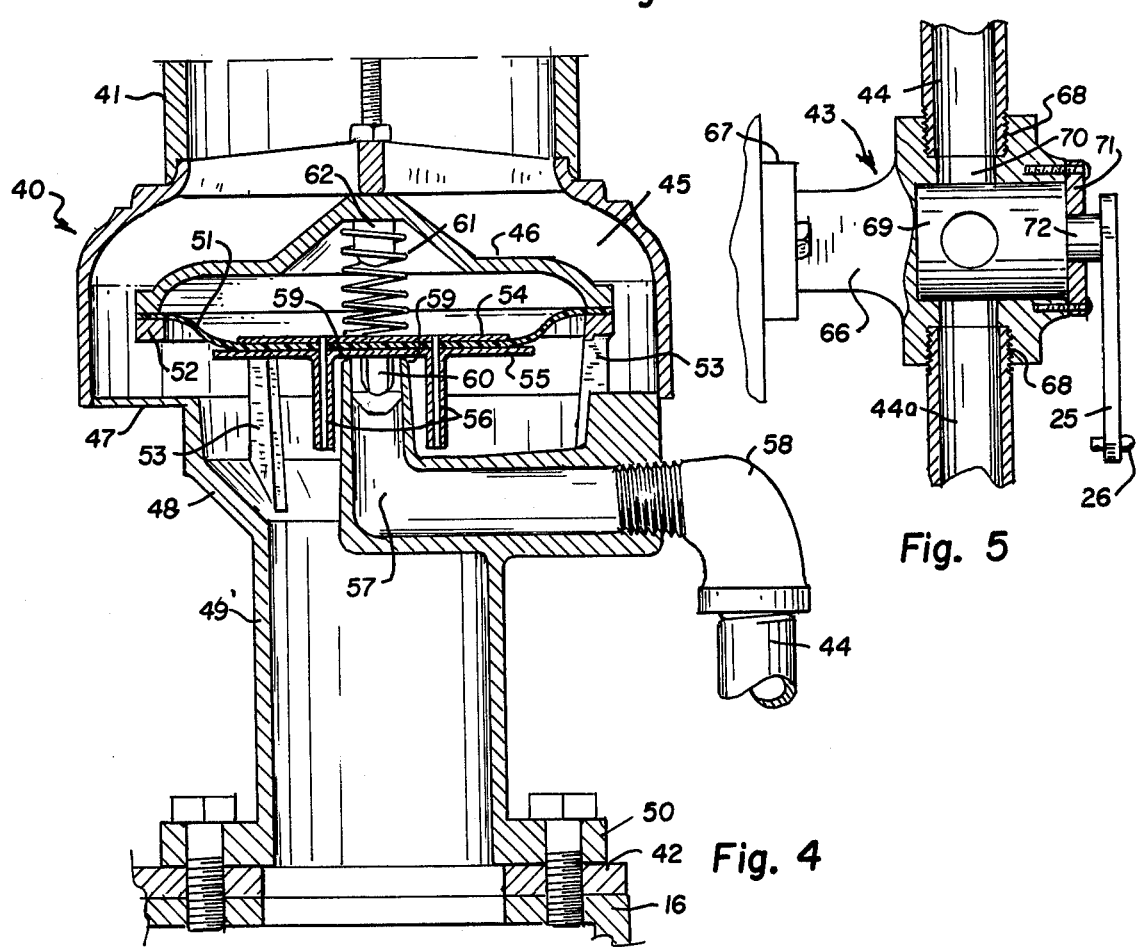
Fig. 4
Fig. 5

FUEL REGULATOR FOR A TWO-CYCLE GAS ENGINE

The present invention is a continuation-in-part of my application, Ser. No. 532,624, filed Dec. 13, 1974 now Pat. No. 3,919,995, to claim matter disclosed but not claimed in that application, and to disclose and claim other related subject matter.

The present invention relates to regulation of gas inflow in gas engines, and more particularly to the regulation of gas inflow in the heavy weight, single cylinder, two-cycle, port-scavenging gas engines of the type which are often used for pumping operations in oil fields and for similar continuous, heavy-duty work. Ajax and Climax engines are two types commonly used for this purpose.

The engines wherein the present invention is useful are the largest, two-cycle, port-scavenging gas engines that are in use. Ordinarily, they are constructed as single cylinder, crosshead type units. Also, they may be twin cylinder units, but if so, the infeed components are separate for each unit and thus, insofar as the present invention is concerned, only a single cylinder unit need be considered. These large engines may be classed as having a displacement exceeding 250 cubic inches and some have a displacement of 2000 cubic inches. Thus, they will herein be called "large gas engines".

In most of these heavy, slow moving, single cylinder gas engines, the air intake consists of a rigid pipe ordinarily in the form of an elbow which turns from an intake port at the top of the engine to extend horizontally therefrom and to connect with an air cleaner. There is no restriction in this line. A gas inflow line is connected to this air intake pipe or to the intake of the engine associated therewith. A throttle valve, or a gas cock, in this gas inflow line, functions to control the maximum flow of natural gas to the engine. A governor valve associated with the intake keeps the engine speed constant. Since the fuel, natural gas, is in a vaporous state, the engines do not use any sort of a carburetor, for mixing of the gas and air will occur in the intake and in the scavenging chamber of the engine.

In the past, in oil well pumping operations where most of these engines are used, there was usually an excess of natural gas which, until recently, was allowed to escape or was flared. Since the natural gas was easily available, the cost of driving the engines was nil. With the present fuel shortage, however, the value of fuel, and especially natural gas, has increased to the point where conservation and efficient use of natural gas is imperative. Thus, more than one oil field pumping operator is faced with the problem of changing his pumping engines from the bulky, inefficient gas engines to electrical or diesel engines and incurring a substantial investment expense in doing so. This hurts the field operation, especially if the oil production is not large. Thus, where an operator has gas pumps on hand, he will endeavor to make them work more efficiently if at all possible. The heavy, comparatively slow gas engines have a very long life, are cheap to maintain and have been used in the oil fields for many years. They are still used extensively even though some types are obsolete and are not being manufactured at present. To keep them in operation and properly maintained, various supply companies furnish parts and components for these obsolete machines, as well as for types being presently manufactured.

The present invention was conceived and developed with the foregoing, and other considerations in view, and comprises, in essence, a gas regulator for large, two-cycle gas engines. This gas regulator is similar to regulator components within certain types of gas carburetors. Other components within a conventional carburetor, such as the venturi and butterfly valve, are conducive to the reduction of pressure in the gas engine and thus, a carburetor of a conventional type cannot be used. The function of the regulator is to meter the flow of gas to correspond with the flow of air into the intake of the gas engine without restricting the air intake flow.

Many operators are desirous of installing regulators in their gas engines and there does exist several types of gas carburetors which, if modified in the manner herein set forth, can be used for this purpose. For example, Impco Carburetion Inc. of Los Angeles, California, manufactures a line of downdraft carburetors, such as their Models 200, 210 and 425 which can be used with these engines.

These gas carburetors are designed primarily to be used with other types of industrial engines, such as four-cycle engines. No one contemplated that there would be a demand for mounting regulators upon the large gas engines used in oil fields. Moreover, carburetors cannot be used for this purpose. The invention thus lies in the discovery that conventional carburetors could be modified to function in a manner entirely different from the regular carburetor operation.

One reason for not using conventional carburetors on these large gas engines resides in the fact that any suction at the intake of the engine which would result in a pressure reduction, such as will occur in a carburetor, would reduce the pressure in the scavenging chambers and in the cylinder during the intake stroke to the point where there is a substantial power loss in the engine. To operate effectively, these large engines are designed so that the pressure in the scavenging chamber must be close to atmospheric pressure when the piston is at top dead center, and ready to fire, so that the pressure buildup in the scavenging chamber is sufficient to effectively blow out and replace the burnt gas in the cylinder as the piston strokes to bottom dead center. Also, the seals on the engines are such that at sub-atmospheric pressures, oil leakage occurs.

However, it has been demonstated that with a proper regulator, as herein disclosed, which will regulate the gas inflow in such a manner as to be proportional to the air flow rate at the intake, the fuel consumption of these engines in some cases can be reduced as much as fifty percent. Thus, with the impending fuel shortage, this savings in fuel can be the difference between continuing a pumping operation with the available gas engines for a small investment or scrapping the gas engines and investing a large sum for electrical or diesel engines. In a marginal operation, the fuel savings by the proper use of a regulator can be the difference between a profit and a loss.

Even without the problem of marginal operation, it was discovered that a proper regulator is desirable on these large, heavy engines. In the first place, the engines are much easier to start and the costs for maintaining starting equipment is reduced. Also, a regulator provides a fail-safe situation should the engine accidentally stop.

These advantages of a regulator are far more than might be expected and constitute the objects of the invention, as follows:

The improved efficiency of engine operation, insofar as reduced fuel is concerned, is from 15 to 50 percent. In every instance tested, the efficiency increased at least 15 percent. The greater increases in fuel consumption efficiency, up to 50 percent, are believed to be attributable to the difficulty in adjusting these engines once they are running. The arrangement used in the present invention eliminates the need for delicate adjustments requiring a skillful operator.

The engine may be started without effort with one or two turns of the flywheel, whereas conventional arrangements require much adjustment and a skilled operator to get the proper admixture of gas to fire in the cylinder during starting. Cranking these engines for 10 or 15 minutes has been a common chore.

The arrangement according to the present invention will cut off the flow of gas whenever the engine stops. In assuming, in the past, that natural gas was an excess commodity, no provision was made in a conventional gas engine for stopping the flow of gas if the engine stops. This, plus the fact that such engines, when running in a pumping field, are commonly not inspected more than once a day, means that gas losses and explosion hazards are serious.

With the foregoing and other objects in view, my present invention comprises certain constructions, combinations and arrangements of parts and elements as hereinafter described, defined in the appended claims, and illustrated in preferred embodiment by the accompanying drawing in which:

FIG. 3 is a diagrammatic, perspective view of the gas engine similar to FIG. 1, but illustrating a regulator mounted upon the intake and a modified control valve, in accordance with the principles of the invention.

FIG. 4 is a sectional elevational view through the regulator shown at FIG. 3, but on an enlarged scale.

FIG. 5 is a sectional elevational view through the control valve shown at FIG. 3, but on an enlarged scale.

Figure 1:
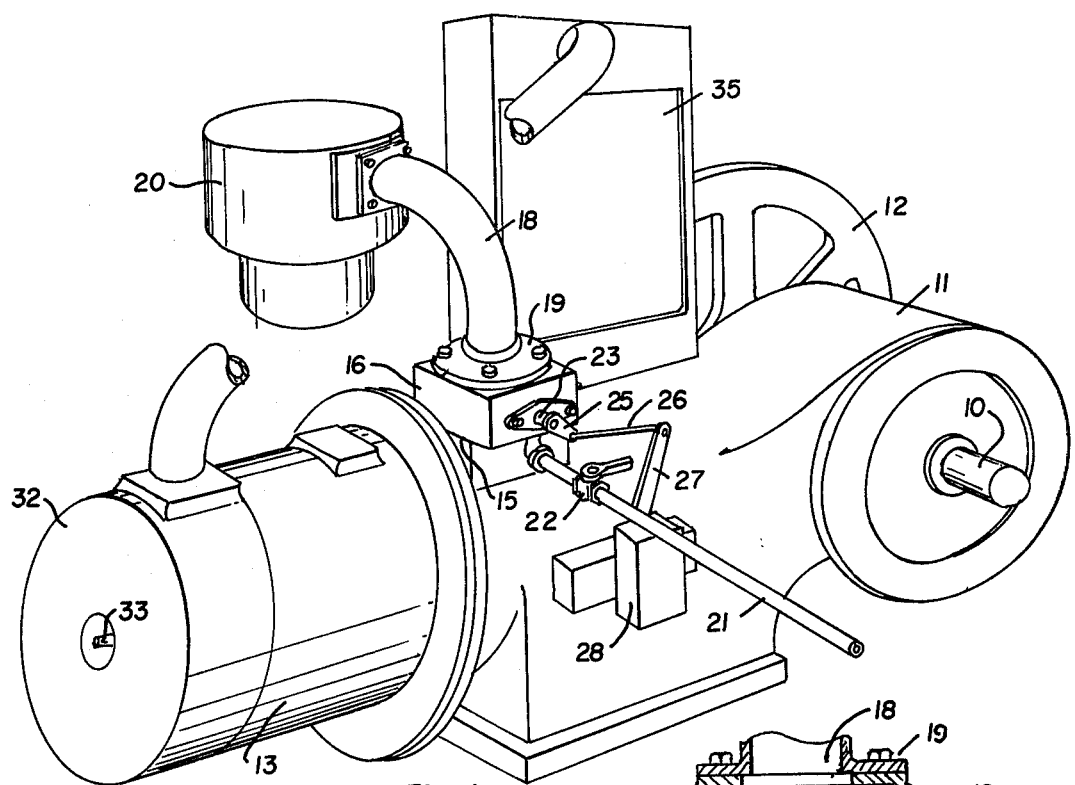
FIG. 1 is a somewhat diagrammatic, perspective view of a gas engine of the type to which the invention may be applied as shown with the conventional intake pipe and control system.
Figure 2:
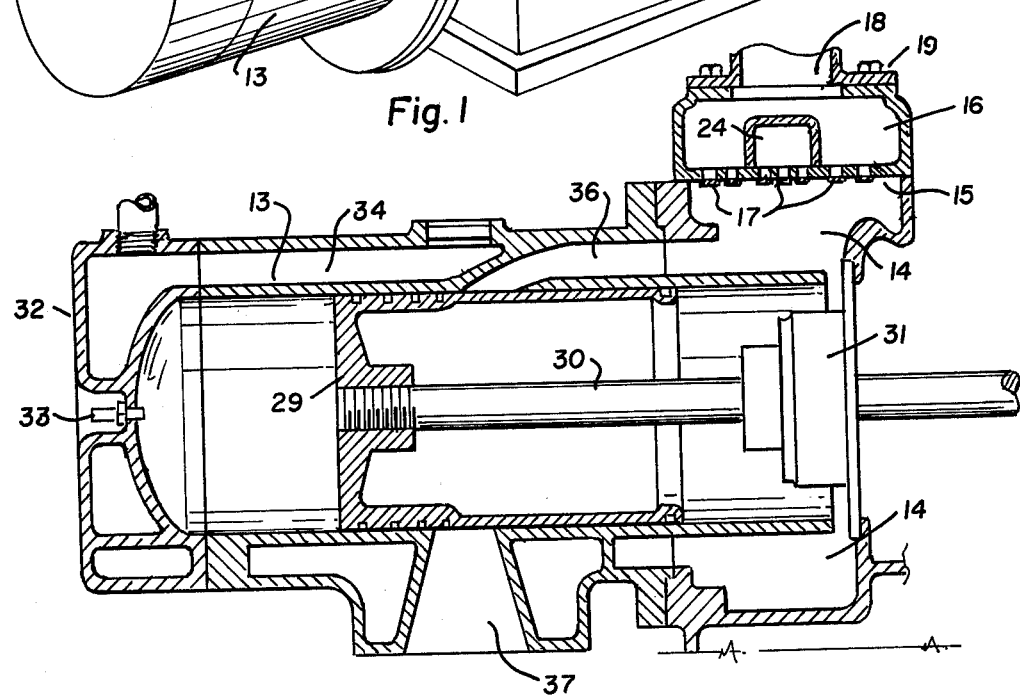
FIG. 2 is a longitudinal, sectional, elevational view showing the cylinder and intake section of the engine with arrows indicating the piston as moving towards the compressive stroke where air is being pulled into the compressive-air intake stroke of the engine.

Referring more particularly to the drawing, the gas engine illustrated at FIGS. 1 and 2 is exemplary of large, single cylinder, two-cycle, port-scavenging engines used for heavy duty operations such as pumping. The engine includes a drive shaft 10 at one end of a heavy cast iron body 11. The shaft extends as a stub from one side of the body 11 to connect with the apparatus being driven which is not shown. The shaft also connects with a flywheel 12 at the other side of the body. A cylinder 13 is located at the end of the body, opposite the shaft 10.

The engine receives air and gas which flows into a mixing chamber 14 at the base of the cylinder, as shown at FIG. 2. An intake port 15 is positioned at the top of the mixing chamber 14 and a receiver 16 is mounted upon this intake port 15 to receive both air and gas, the receiver having reed-type check valves 17 at its base to permit air and gas flow into the mixing chamber, but to prevent a back flow of air or gas from the mixing chamber.

A short air intake line 18 is connected to the top of the receiver 16 as by a flange 19 bolted to the receiver in a conventional manner. This air intake line 19 is formed as a heavy pipe elbow extending upwardly from the intake port and turning horizontally to be connected to an air cleaner 20. The passageway through the air cleaner 20, the receiver 16 and into the mixing chamber 14 is interrupted only by check valves 17 at the base of the receiver 16. Thus, a maximum flow therein is effected with a minimum reduction of air pressure within the mixing chamber, a condition necessary for effective, efficient operation of these large engines.

A natural gas line 21, under pressure, supplies fuel for operation of the engine and the flow through this gas line is first controlled manually by a throttle valve 22 at any suitable location in the line near the engine. Thence, the line turns into the receiver 16 to first pass through an automatic regulator valve 23 and thence into an internal chamber 24 within the receiver 16. The gas flow is from this chamber 24 and to the mixing chamber 14. The regulator valve 23 is a rotary type having a control shaft projecting from the receiver which is turned by a lever arm 25 mounted thereon. This lever arm is connected by a link 26 to the arm 27 of a governor 28. The governor is a standard component of the engine associated with the drive shaft 10 of the engine. The arm 27 will thus move backwards and forwards to close or open the regulator valve 23 to maintain a constant engine speed.

Viewed internally, FIG. 2, the engine includes a piston 29 within the cylinder 13 whose rod 30 extends through a gland 31 at the base of the mixing chamber 14 of the engine. With this arrangement, the piston rod 30 will be pivotally linked to a connecting rod, not shown, for attachment to the crank of shaft 10 in a conventional manner. The cylinder 13 of this engine is capped by a head 32 carrying a sparkplug 33. Both the cylinder 13 and head 33 are jacketed to provide a cooling chamber 34 wherein cooling fluid circulates and is cooled as by a radiator 35. This jacketed construction of the cylinder 13 is interrupted by an inlet passage 36 extending about a substantial upper portion of the wall of the cylinder 13 and an exhaust passageway 37 extending about a substantial lower portion of the wall of the cylinder 13.

This two-cycle, port-scavenging gas engine operates in a well known manner with the gas and air being pulled into the mixing chamber 14 as the piston 29 moves toward the head of the cylinder during the compression stroke. Next, the air and gas mixture within the mixing chamber is compressed during the power stroke to provide for a sudden flow of gas under pressure into the cylinder as the spent gas from the previous power stroke moves from the exhaust. The problems which occur in operating such an engine where the gas flow is continuous have been heretofore outlined and include difficulties in starting the engine, a general inefficiency insofar as the quantity of fuel gas needed to operate the engine is concerned, and an unreasonable loss and hazard which will occur should the engine stop when no one is near it to manually shut off the gas flow. The large gas engines with which the present invention is concerned, engines having a displacement exceeding 250 cubic inches, will include a number of well known Ajax engines such as the models EA-30 and E-42.

FIGS. 3, 4 and 5 show how the gas engine illustrated at FIG. 1, a typical, two-cycle, port-scavenging engine, will be modified according to the present invention. The engine and its several components is unchanged, excepting for (a) the addition of a fuel regulator 40; (b) a modified air intake line 41 to accommodate the fuel regulator; (c) a suitable bracket 42 to support this modified line 41 and the air cleaner 20; (d) an external automatic valve 43 to replace the automatic valve 23 within the receiver; and (e) a terminal reach 44 on the gas line 21 which turns to extend through the external, automatic valve 43 and connect with the fuel regulator 40. As hereinafter described, the automatic valve 43 will be linked to the governor 28 to control the gas flow into the regulator 40 responsive to the speed of the engine.

With the modifications as set forth, the fuel gas input to the engine will flow through the fuel regulator 40 which functions to release gas into airflow from the intake line 41 before the air and gas flow to the mixing chamber 14. The amount of gas thus mixed with the air is directly related to the air inflow. The fuel regulator 40, as illustrated in section at FIG. 4, may be for the sake of convenience, a modified downdraft gas carburetor such as the Impco gas carburetors previously mentioned. Carburetion with a conventional gas carburetor will improve the performance of a two-cycle, port-scavenging engine to some degree, but not to the degree desired nor attained when modified as now described. In the present invention, the carburetors which may be used as regulators have all restrictions in the passageway removed. Any restriction at the intake of the gas engine which will reduce the pressure within the mixing chamber to any significant degree, will adversely affect its performance. The only components within a conventional carburetor which are retained in the present invention are the gas release mechanisms which function to release fuel gas in an amount which is proportional to the air flow through the carburetor.

Referring to FIG. 4, the air intake line 41 extends from the air cleaner 20 to an enlarged, bell-shaped head 45 of the fuel regulator 40 and this construction is essentially symmetrical about its longitudinal axis from the connection with the air cleaner to its connection with the air receiver 16 of the engine. A central, circular shield 46 is mounted within this bell-shaped head to deflect the air flow from line 41 from the center of the passageway to the outer periphery of the bell-shaped head 45. The base of the bell is closed by a floor 47 which is stepped, as at 48, to extend downwardly and inwardly to the downward discharge stand tube 59 of the unit. This stand tube 49 is mounted upon and over an opening in the bracket 42 as by a flange 50 bolted thereto. The bracket intake opening, in turn, is over the intake passageway of the engine receiver 16. The passageway area through the regulator, though obstructed by the shield 46 at the enlarged head, is not constricted in a manner which causes a significant pressure drop in the receiver 16.

The peripheral edge of the central shield 46 is downturned and the chamber formed underneath it is closed by a flexible diaphragm 51, the diaphragm being held to the edge of the shield 46 by a support ring 52. This ring is carried by a spider of legs 53 upstanding from the base of the step 48. The central portion of the diaphragm 51 is rigidified by upper and lower plates 54 and 55 respectively, which are secured together with the diaphragm between them in any suitable manner such as by riveting. Suitable air passageways are provided in nipples 56 depending from the lower plate 55 to extend through the plates and diaphragm to provide communication between the interior of the chamber near the central portion of the passageway below this central shield 46 and at a point in the passageway where a slight pressure reduction in the air flow, due to a Bernoulli effect, will impose a vacuum in the chamber.

A gas passageway 57 extends from one side of the regulator 40 at a suitable point below the shield 46 to the axial center of the regulator and this passageway turns upwardly at the axis of the unit to abut against the underside of the lower plate 55 in a centered, balanced manner. A connector elbow 58 connects the terminal reach 44 of the gas line 21 to the intake of this passageway. The passageway exit 59 is flattened and smooth so that whenever the lower plate 55 rests against it, all flow of gas through the passageway is cut off. A splined boss 60 is attached to the underside of the lower plate to extend into the passageway 57. To complete the organization, a spring 61 is mounted within the chamber formed by the shield 46 and the diaphragm. This spring 61 is secured in position upon a stub 62 depending from the center of the shield 46.

Operation of this regulator is apparent from the foregoing description. It is to be noted that the air intake line is rather large in diameter so that the pressure drop due to velocity will not be great and there will not be any significant pressure loss as air flows into the mixing chamber 14 of the engine. A slight reduction in air pressure as air flows past the floor 47 and into the stand tube 49 will be sensed at the nipples 56 to reduce the air pressure within the chamber between the shield 46 and diaphragm 51. This lifts the diaphragm against the bias of the spring 61 and thereby opens the exit 59 of the passageway 57 to permit gas, under a small pressure, to flow into the regulator and mix with the air flow. The operation of this regulator is such that the gas flow is essentially proportional to the air flow at both low velocities and high velocities and the instant the air flow ceases, the diaphragm, urged by the spring 61, will lower and close the exit 59 of the gas passageway 57.

The gas line 21 includes the manual throttle valve 22 near the engine, as heretofore described. This line turns upwardly adjacent to the engine as at an elbow 65 to join a short section 44a of the reach 44 which connects with the automatic control valve 43. Thence, the reach 44 extends from the automatic control valve and upwardly to connect with the elbow 58 heretofore described.

The automatic control valve 43 is located at essentially the same position, and in the same manner, as the conventional automatic valve 23 within the receiver 16 which it replaces. Thus, the control valve 43 may use the link 26 and arm 27 of the governor 28 with a minimum of adjustment. This valve 43 is a plug-type valve having a body portion 66 carrying a flange 67 which is bolted to the face of the receiver 16 at the same position as was the conventional automatic valve 23 placed. The pipe sections 44 and 44a are secured in opposite tapped ends 68 of the valve 43 with a plug 69 traversing the passageway 70 through the valve. The plug 69 is secured in place by a cap 71 and an axial boss 72, extending from the plug, extends through this cap to connect with the lever arm 25 which, in turn, connects with link 26 extending from the arm 27 of governor 28.

The operation of this system is identical to the operation of the two-cycle engine in the conventional arrangement heretofore described, excepting that the regulator provides for the air-gas mixing to occur in the passageway to the mixing chamber and the proportions of gas to air are essentially constant, regardless of fluctuations in the rate of air flow. The improvement in operation, using this regulator 40, is first, the ability to start the engine quickly by having to crank the engine only once or twice. This thus eliminates the need for a skilled operator. Starting may be accomplished by simply turning on the ignition and pressing a starter button. The significant decrease in the consumption of fuel, when running, will become apparent after a few days running. The final big advantage concerns the shutoff of the engine. Thus, the manual valve 22 is not essential and is needed only when repairs are underway. The valve 43, operated by the governor 28, still controls the flow of gas to regulate the speed of the engine.

The fuel savings of this arrangement has been checked on a number of installations. In every instance, the fuel savings has exceeded 15 percent, and in some installations the savings has been as much as 50 percent. Assuming that the large fuel savings is the result of improperly adjusting the conventional engines in the first instance, it is apparent that the regulator, mounted as described, will save up to 15 percent of the fuel used in a conventional gas engine intake arrangement.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

What is claimed is:

1. In combination with a large two-cycle post-scavenging gas engine of the type having a piston displacement exceeding 250 cubic inches, a single cylinder associated with a crankcase chamber which constitutes an air-gas mixing chamber and an air-gas receiver connecting with the crankcase chamber with a low-pressure-drop check valve means to prevent backflow from the crankcase chamber, a fuel regulation system comprising:
   (a) an air intake line having an uninterrupted flow passageway to the aforesaid receiver;
   (b) a fuel gas regulator in the air intake line;
   (c) a fuel gas supply line to the fuel gas regulator; and wherein
   (d) said fuel gas regulator is of the type having a substantially unrestricted passageway with respect to the air intake line whereby to minimize the pressure drop of air flowing through the intake line and to the mixing chamber and also having an air flow control means to permit the fuel gas to flow into the air intake line responsive to and proportional to the flow of air in the line through the regulator whereby a properly proportioned air-gas mixture always flows into the engine regardless of changes of air flow rate through the air intake line.

2. In the organization defined in claim 1, wherein said fuel gas regulator flow control means includes:
   a chamber having a diaphragm at one side thereof and within the passageway;
   a passageway means communicating from the chamber and to a location in the passageway through the regulator where the air pressure is reduced responsive to air flow velocity whereby a vacuum is induced into the chamber to flex the diaphragm; and
   a valve seat closure in the gas line, within the regulator, adapted to open to release gas whenever the diaphragm is flexed.

3. The organization defined in claim 2, wherein:
   said chamber is positioned at the center of the passageway through the fuel regulator and the passageway about the fuel regulator is enlarged to avoid constriction of the same.

4. In the organization defined in claim 1, including:
   a control valve means in the fuel gas supply line; and
   a governor means associated with the engine to operate the control valve means to increase and to diminish the fuel gas supply and thereby control the speed of the engine.

5. A method for providing a properly proportioned air flow at the intake of a port-scavenging gas engine of the type having a piston displacement exceeding 250 cubic inches, a single cylinder associated with a crankcase chamber which constitutes an air-gas mixing chamber and an air-gas receiver connecting with the crankcase chamber with a low-pressure-drop check valve means to prevent backflow from the crankcase chamber, including the steps of:
   (a) providing an air intake line having an uninterrupted flow passageway to the receiver;
   (b) placing a fuel gas regulator in the air intake line which is proportioned to produce a substantially unrestricted passageway with respect to the air intake line to minimize the pressure drop of air flowing through the air intake line and to the mixing chamber;
   (c) connecting a fuel gas supply line to the fuel gas regulator; and
   (d) restricting the flow of fuel gas through the fuel gas regulator such as to provide a properly proportioned air gas mixture flowing into the engine regardless of changes of the air flow rate through the intake line.

* * * * *